United States Patent [19]

Yasrebi

[11] Patent Number: 5,463,625
[45] Date of Patent: Oct. 31, 1995

[54] HIGH PERFORMANCE MACHINE FOR SWITCHED COMMUNICATIONS IN A HETEROGENEOUS DATA PROCESSING NETWORK GATEWAY

[75] Inventor: Mehrad Yasrebi, Scarborough, Canada

[73] Assignee: International Business Machines Corporation, Armonk, N.Y.

[21] Appl. No.: 131,059

[22] Filed: Oct. 1, 1993

[51] Int. Cl.$^6$ .................................................. H04L 12/46
[52] U.S. Cl. ........................................ 370/85.13; 395/650
[58] Field of Search ............................. 370/85.13, 85.2, 370/85.1, 85.9, 85.14, 94.1, 60; 395/650, 200, 275, 525; 364/DIG. 1, 230.3, 238, 238.2, 238.3, 281.3, 281.4, 281.7, 281.8, 284, 900, 931.4, 931.41, 931.42, 931.43, 942.07, 942.5

[56] References Cited

U.S. PATENT DOCUMENTS

| | | | |
|---|---|---|---|
| 4,417,244 | 11/1983 | Melas | 340/825.8 |
| 4,896,319 | 1/1990 | Lidinsky et al. | 370/60 |
| 4,897,874 | 1/1990 | Lidinsky et al. | 380/3 |
| 4,958,341 | 9/1990 | Hemmady et al. | 370/60.1 |
| 4,972,368 | 11/1990 | O'Brien et al. | 364/900 |
| 5,117,429 | 5/1992 | Lagoutte | 360/60 |
| 5,144,293 | 9/1992 | Rouse | 340/825.02 |
| 5,179,702 | 1/1993 | Spix et al. | 395/650 |
| 5,247,676 | 9/1993 | Ozur et al. | 395/650 |
| 5,249,293 | 9/1993 | Schreiber et al. | 395/650 |
| 5,307,490 | 4/1994 | Davidson et al. | 395/650 |

FOREIGN PATENT DOCUMENTS 9216079  9/1992  WIPO.

OTHER PUBLICATIONS

IBM TDB, No. 2, Jul. –1992, pp. 404–407; "A Priority Mechanism for Flow–Control . . . ", 1983 Conf. Proceedings, Phoenix, Ariz., Mar. 14–16, 1983; Analyzing Novell. Networks, pp. 259–261; Intro. to OSF DCE, p ix–3–14 20; LAN TIMES, Dec. 30, 1991, vol. 8 iss. 24; Netware Buyers Guide, pp. 3–132–3–136; Netware Asynchronous Services. Interface, p i–A–10; Distributed Systems Concepts & Design, p. 1–113.

Primary Examiner—Douglas W. Olms
Assistant Examiner—Huy D. Vu
Attorney, Agent, or Firm—Joscelyn G. Cockburn

[57] ABSTRACT

In a distributed system, such as a local area network having a facility for synchronous remote procedure calls and multi-threading, an interface mechanism for linking client workstations on the distributed system with external switched communications networks is provided. The interface extends the remote procedure calling facility beyond the distributed system by classifying the different types of remote procedure calls that can be issued to a switched communications gateway in the distributed system, and permitting the issuance of multiple threads of control, according to the type of function the procedure call represents. Related functions are forced to execute sequentially at the gateway, while those classified as unrelated functions can execute sequentially. The advantages of heterogeneity and concurrency of the distributed system are thus extended to its switched communications links with external switched networks.

6 Claims, 6 Drawing Sheets

HIGH PERFORMANCE MACHINE FOR SWITCHED COMMUNICATIONS IN A HETEROGENEOUS DATA PROCESSING NETWORK GATEWAY

FIELD OF THE INVENTION

The present invention provides an interface mechanism in a communications gateway for linking users in a heterogeneous distributed system, such as a local area network (LAN), to remote services over a circuit-switched communications network. It also enables users, remotely located across one or more circuit switched networks, to access services offered by one or more machines situated on one or more heterogeneous local networks.

BACKGROUND OF THE INVENTION

A distributed system is, broadly speaking, an aggregate of individual systems that are connected via electronic communications. The separation of components inherent in a distributed system provides advantages over a tightly integrated system approach in allowing the truly parallel execution of programs, the containment of faults without system disruption, and the use of isolation and interlocks as security enforcement measures.

A LAN is a type of distributed system that loosely couples remote processors and workstations. Generally, workstations on a LAN do not share a central memory, but do share common servers such as one or more file servers, print servers, etc. High-speed LANs, in particular, effectively increase the power and flexibility of workstations (computers designed for one or more single users with sufficient processing power and memory to run users application programs) by enabling them to have access to shared data and resources located in their own and other server computers.

The LAN system that has been in the widest use in recent years is produced by Novell, Inc. of Provo, Utah. In a Novell system, a LAN device driver is implemented on top of the local operating systems to be coupled, and device driver commands (and responses) at the LAN workstations are directed from (and to) the workstations onto the LAN to (and from) the target servers.

As the users of personal computers and workstations, as well as minicomputers, mainframes and supercomputers, try to take better advantage of their combined resources, LANs are being grown with disparate (i.e., heterogeneous) systems made up of the variety of hardware, software and applications already installed.

However, network access and connectivity alone are not sufficient to perform useful work between disparate systems on a LAN. These components must have a common understanding of the particular type of work or application to interoperate. They must also utilise the same procedures to implement that type of work. One level of interoperability is to establish terminal emulation to access applications on other systems. Another option is to use a batch file transfer mechanism to transfer data to another machine, where a program will parse the data and perform work on it according to a pre-established protocol. Both of these mechanisms require system specific software that is not portable without modification, for connecting other types of hardware and/or operating systems.

One goal of developments in distributed systems is to develop means for providing interoperability that is more universal (portable to a larger number of computers and/or operating system types), while maintaining transparency (concealment of separation) to the user (whether that user is a machine or application). Ideally, the user should not be aware of accessing resources on remote servers in a LAN, but should perceive the system as a whole rather than as a collection of individual components.

In a homogeneous distributed system, such as the Novell Netware[1] LAN, each separate computer has the same operating system and identical software hierarchy. In the Novell system, this is the Netware Asynchronous Service Interface (NASI). The LAN device driver contains facilities for communications between processes in separate computers. Again, in the Novell system, this is the Netware Asynchronous Communications Server (NACS).

[1]Trademark of Novell, Inc.

The Distributed Computing Environment (DCE) of the Open System Foundation (OSF[2]) is a very recent emerging technology enabling distributed computing among heterogeneous systems. When implemented on each of the disparate systems, DCE allows transparent interoperation between computers on the LAN through a mechanism called the remote procedure call (RPC) that extends to the distributed environment the concept of a local procedure call, a well understood communications mechanism for constructing a program using subroutines (also called subprograms or procedures) within an operating system. The RPC mechanism is implemented in DCE in conjunction with a multithreading capability similar to that described in the IEEE POSIX 1003.4a draft standard[3]. This combination permits RPC concurrency in the OSF DCE environment.

[2]Trademarks of the Open Software Foundation
[3]IEEE P1003.4a/D4 draft standard, *Threads Extension for Portable Operating Systems*, Technical Committee on Operating Systems of the Institute of Electrical and Electronic Engineers (IEEE) Computer Society, New York, N.Y., USA, Aug. 10, 1990.

Normally, in the absence of an RPC mechanism, there is a unique interface between the calling program and a specific subroutine, and the local procedure call invokes all necessary logic for operability. When the subroutine resides on a different machine than the calling program, communications logic (i.e., the location of the subroutine, data conversions, etc.) is required for the call and must be hard-coded into the calling and/or called programs.

In OSF's DCE, the RPC itself automatically invokes the communications services for the programmer, and all, or optionally almost all, communications code, error handling and data conversion are handled transparently, thereby removing concern for the communications mechanisms from the programs that use remote procedures.

In the DCE system, for each subroutine call, the RPC mechanism can automatically invoke a directory that provides naming and other support protocols for every resource in the network. Thus, application programs can make use of distributed services by issuing calls to remote procedures by name, without knowing their location(s). This provides location transparency, as the distributed system is completely configurable in terms of the location of its components. As described above, the RPC mechanism also permits heterogeneity in the DCE environment.

The increasing proliferation of remote electronic information exchange has made access to remote servers such as processors and databases a necessity. This access is often facilitated through circuit-switched communications links over wide area networks (WANs).

A useful description of a typical switched area network of this type is that found in U.S. Patent Nos. 4,896,319, 4,897,874 and 4,958,341, all to A T & T, that relate to a "metropolitan area network" (MAN). The switches described in these patents are similar to those typically used for WANs, although the protocols for the type of system specified appears to be directed to the secure transmission of data.

Typically, access to or from a remote machine across a WAN from (or to) a workstation on a LAN is gained by instituting a switched communications link through a LAN gateway server. A device driver for the gateway is provided with physical ports (or modems) that can be linked to switched communications WANs.

Existing gateway mechanisms, such as Novell's NACS and NASI, are generally implemented on top of the LAN device driver as a switched communications device interface and a LAN redirection facility on the workstation programming interface, and a corresponding LAN redirection facility and switched communications device interface implemented at the gateway, providing for both the transmission and receipt of switched communications links through the gateway modems. Redirections are also used for communicating serial port and modem commands between the gateway and other machines on the LAN.

In such systems, the user's initialization of the communications link-up procedure redirects the user hardware commands to the gateway. The communications interface in the gateway driver then institutes and maintains the switched communications link, diverting hardware resources of the driver to do so. An exclusive device driver access mode would typically be used in accessing the remote ports. The connection and access procedures are then executed using the gateway ports and modems ill order to link the user's system with the switched communications network. A remote connection is established through the WAN. This sets up a point-to-point configuration through the port along the communication line between the user computer and server computer, monopolizing the switched communications device in use.

The device driver interface is hardware-oriented, and imposes the restriction that the device drivers in the workstations and LANs support compatible LAN redirection facilities. These are generally not available in a heterogeneous system, with the result that most current LAN systems require that the computer and/or operating system at the workstations and the gateway be homogeneous.

Also, the LAN workstations are effectively in full control of the switched hardware ports at the gateway. This virtually eliminates the possibility of implementing any flexible automatic and transparent support for regulated network attachments in the centralized gateway.

One area impacted is the regulation and certification required for attachment to particular WANs or switched networks. Examples of such regulation include various software timeout and frequency limit requirements for call activities, as well as hardware management schemes. Presently, the workstation software applications should be separately updated according to the periodically-issued CCITT recommendations and separately certified.

In addition, the workstation software applications must be aware of the types of modems attached to the gateway WAN ports, and should replicate specific software support to take advantage of distinct features for these various devices. Because these protocols cannot be implemented at the central gateway, manual configuration steps in the attachment process across all of the workstations are often required.

In order to emulate heterogeneity in systems without RPCs, translation mechanisms are also required to support incompatible data representations (e.g., big and little endian formats) and character sets (e.g., ASCII and various EBCDIC code pages) between the LAN workstations, the gateway and/or the modems. For example, character set support in the Novell-based LAN gateway mechanism is restricted to ASCII, and the word widths of the device driver interfaces are fixed.

While the current approach of redirecting the LAN device driver facilitates relatively fast single-message transfers across the LAN, this direct access also results in monopolization of these driver resources for effecting and maintaining a switched communications link for certain users while denying access to others.

SUMMARY OF THE INVENTION

It is an object of the present invention to utilise the emerging RPC technology to effect switched communications links between LANs and WANs, and particularly, to extend heterogeneity across a LAN environment utilising RPCs, to a switched gateway. It is therefore an object of this invention to provide an interface mechanism for a LAN gateway operable in a heterogeneous distributed environment.

It is also an object of the present invention to provide concurrency for managing switched communications from a heterogeneous network.

It is a further object of this invention to implement a gateway machine that would be useful in transparently and centrally enforcing regulation support for the LAN workstations for accessing WANs and switched networks - by isolating the LAN workstations from direct access to the gateway ports.

Accordingly, the present invention provides an interface mechanism for a switched communications gateway in a distributed computing network having means for issuing remote procedure calls across the distributed network, means for concurrently processing multiple remote procedures calls between at least one computer and the gateway across the distributed system, and scheduling means for sequentially processing remote procedure calls for related functions at the gateway.

Preferably, the scheduling means includes means for classifying remote procedure calls into related functions.

DETAILED DESCRIPTION OF THE PREFERRED EMBODIMENTS

Figure 1:
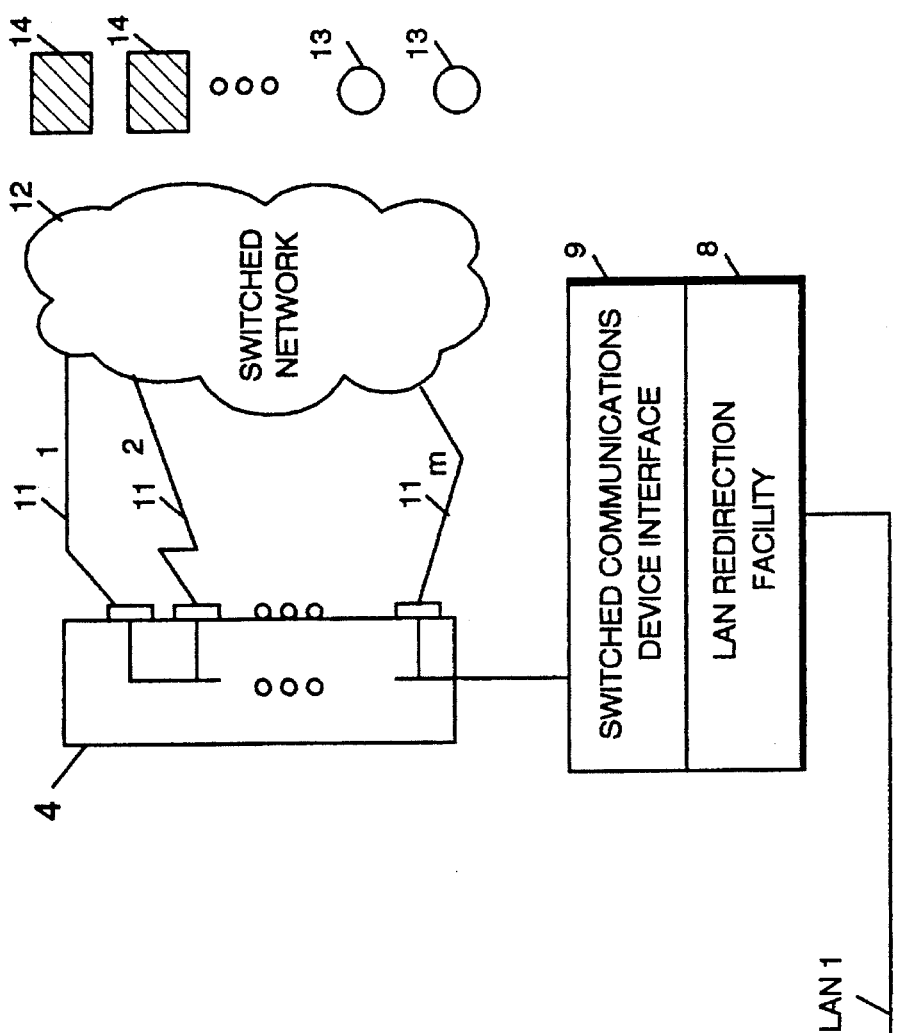
FIG. 1 is a schematic representation of a LAN network supporting a homogeneous computing environment of the prior art.

FIG. 1 illustrates a LAN, generally designated by 1, for a homogeneous computing environment, of the type of the Novell implementation described above.

A client machine 2 on the LAN 1 seeks to issue an outgoing call through the LAN gateway server 4 to a remote server 13 across a switched network 12, while another client machine 3 (also called a server to remote users 14 across the switched network 12) entertains an incoming call received through the gateway server 4. (It should be recognised that a "client machine" is a client to the gateway running at least one application process, and may be attended or unattended by a human agent.)

Figure 3:
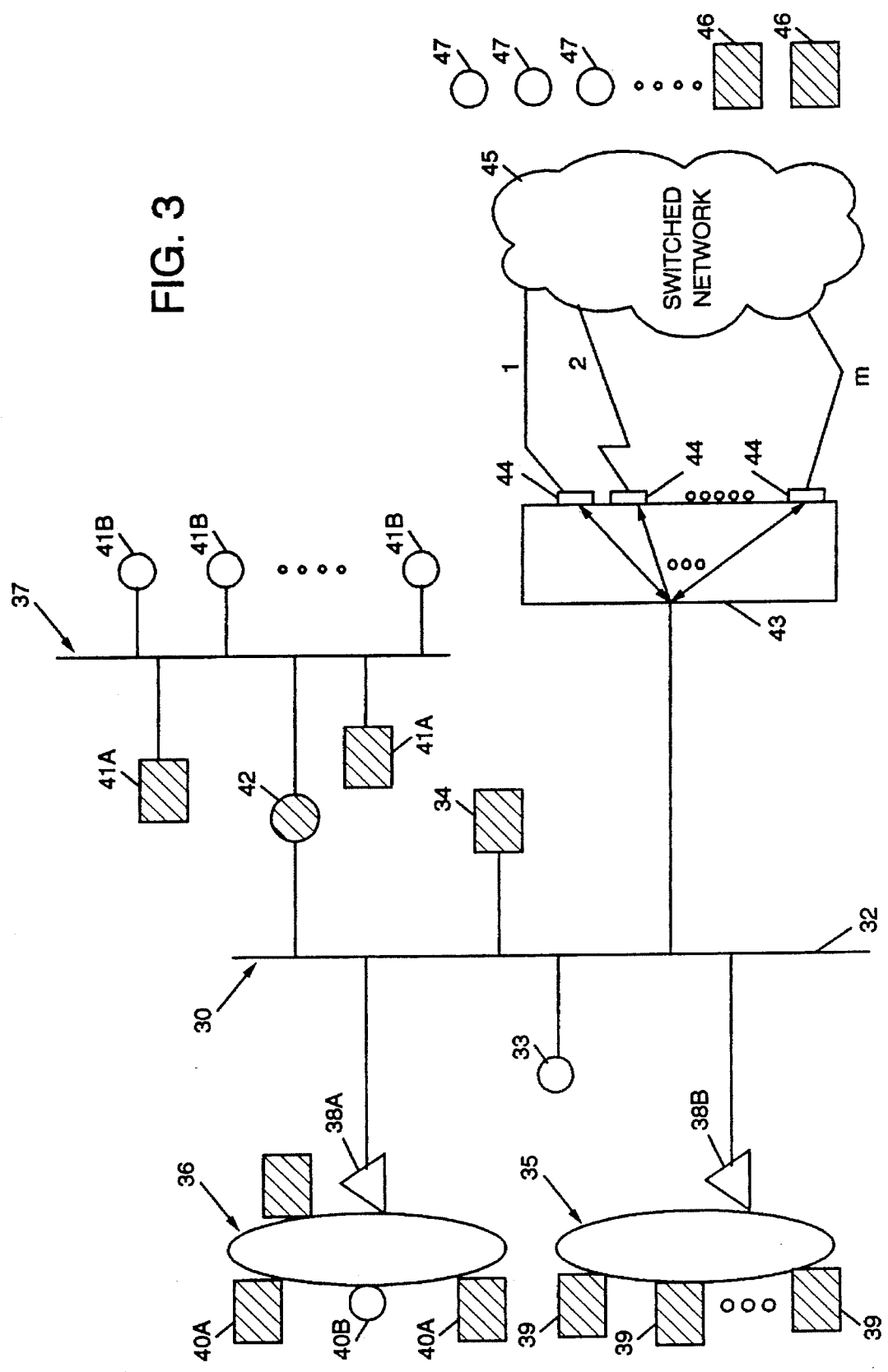
FIG. 3 is a schematic depiction of the target heterogeneous distributed environment and a switched communications network for the high performance communications interface machine of the present invention.

For simplicity, the following common coding has been used in FIGS. 1 and 3 to differentiate the active states of individual workstations and processors in both LANs and WANs: workstations/processors shown as shaded squares are intended to denote client machines issuing outgoing calls, while those depicted as unshaded circles are intended to denote server machines receiving incoming calls.

The client machine 2 with the outgoing call issues a command through its programming interface 5 with the LAN 1 to implement a switched communications interface 6, that in turn connects to a LAN redirection facility 7 for redirecting the device driver commands over the LAN 1 to the parallel corresponding interface mechanisms 8 and 9 at the LAN gateway 4.

The gateway 4 contains a number (m) of switched communications ports 11 that can be linked to the switched communications network 12.

As the command for issuing an outgoing call from the user 2 is received from the LAN 1, the LAN redirection facility 8 and switched communications device interface 9 on the gateway 4 side of the LAN 1 include logic that channels the call command to the target port from the appropriate pool of ports.

An incoming call to the gateway 4 passes, in parallel fashion, through the switched communications device interface 9 and LAN redirection facility 8 on the gateway 4 side of the LAN 1 before crossing the LAN and passing through the communications interface layers 7 and 6 that complete the connection requested by the server machine 3.

Users 2 and 3 can be applications in the same (client) machine or different (client) machines.

In the NACS and NASI implementations of Novell, in the absence of a conversion interface written to the specific application (i.e., accessing a switched communications gateway), the user (2, 3) side and the gateway 4 side of the LAN must utilise a common operating system environment, that is, the LAN must be homogeneous.

In its DCE, OSF has addressed tile homogeneity problem in LANs through the use of RPCs.

Figure 2:
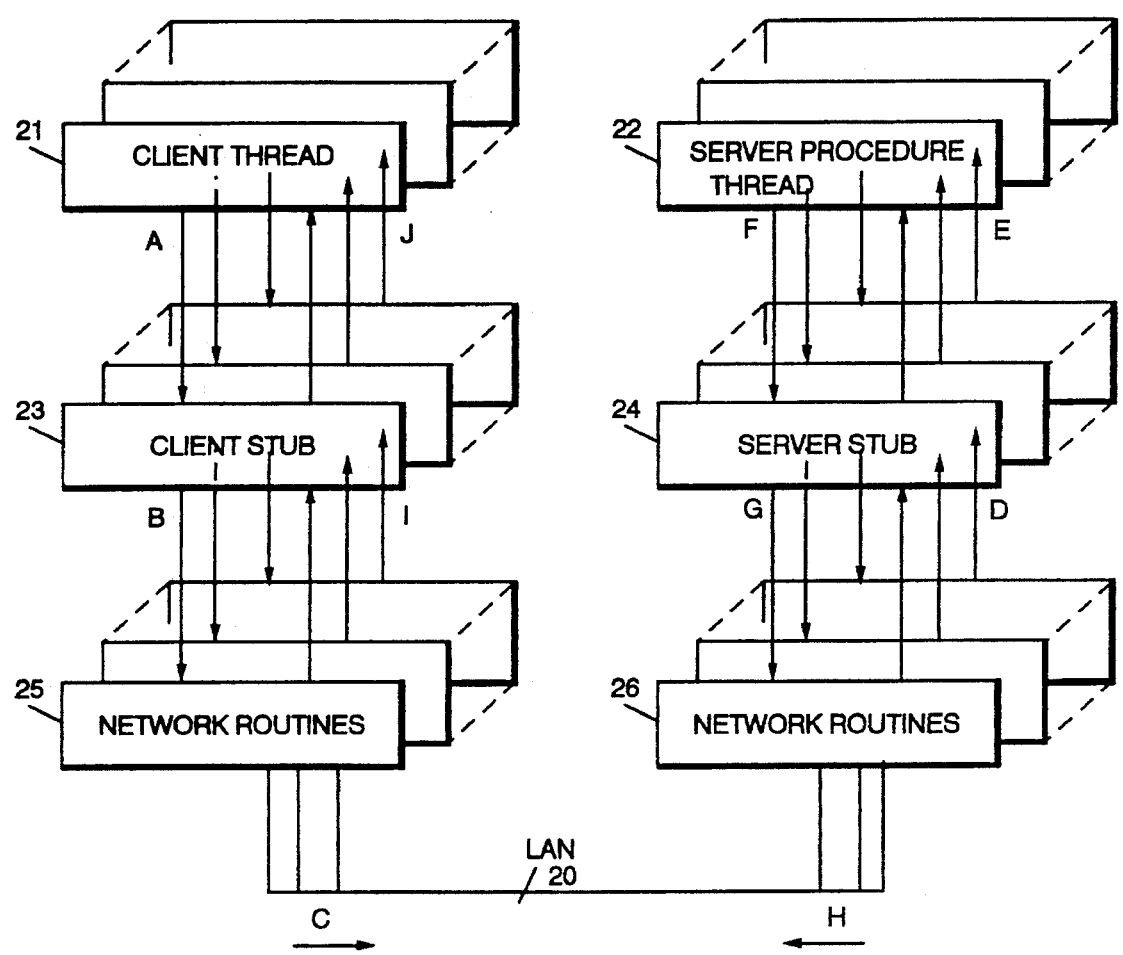
FIG. 2 is a schematic overview diagram illustrating the functional layers in an interface for implementing concurrent RPCs in a LAN.

A schematic overview of the mechanism for implementing RPCs in a LAN, such as OSF's DCE, is shown in FIG. 2. The underlying network is transparent to the client and server programs. Although reference is generally made herein to LANs since this is the predominant implementation, it should be noted that the present invention could also be implemented on a WAN.

Connectivity and interoperability between user workstations and servers that may be heterogeneous (i.e., utilising different computer hardware and/or operating system environments) are achieved using RPC interfaces to implement transparent communications across the heterogeneous distributed system, with tile result that the RPCs appear to the client machine to be transparent local procedure calls.

In FIG. 2, a client workstation application thread 21 and server application thread 22 on opposite sides of a LAN 20 are shown, with the RPC interfaces 23 and 24 interleaved, in symmetrical fashion, between the client thread 21 and the network routines 25 for accessing the LAN hardware (device driver) on one side, and between the server 22 and network routines 26 on the other side. The client thread 21 and its RPC interfaces 23 and network routines 25 are generally implemented in one system, as are the server thread 22 and its RPC interfaces 24 and network routines 26. Through the transparency provided by RPCs, these systems may be disparate (i.e., separate and heterogeneous) or may reside on the same machine and perform in the same way.

The RPC issued from the client thread 21 to the server 22 is sent in the form of a request message (whether this is a remote processor or a server residing on the same machine as the sender), and the server is able to transparently receive the call, execute the procedure and return a reply message. Analogous to local procedure calls, the calling program in the user 21 waits until the called procedure returns.

Because remote procedures cannot have access to any variable or data values in tile calling program's environment (since the procedure is executed in a disjoint address space), an interface compiler (not shown) is generally used as a basis for integration of RPCs into the respective operating system languages of the user 21 and server 22. The interface compiler replaces each call to a remote procedure in the client program by a call to a client stub procedure 23. This is the procedure in the client program that "stands-in" for the remote procedure in the server program. The task of the client stub 23 is to marshal the arguments and pack them up with the procedure identifier into a message, send the message to the server, and then await the reply message, (un)marshal it and return the results.

Before the server program is compiled, it too is preprocessed by the interface compiler that checks the procedure definitions in the server against the interface specification, and generates a server stub 26 that obtains input arguments by (un)marshalling the request message, calling the appropriate server procedure, and when it returns, marshalling the output arguments (or in the case of a failure, an error report) and making a reply message which it sends back to the client.

Through the concurrency provided by multi-threading, several RPC procedures can be occurring simultaneously, in parallel, in the network. This is illustrated schematically in FIG. 2 with multiple instances of each schematic block.

In OSF's DCE, the RPC interfaces support (among other things):

1. network and transport protocols that may be connectionless or connection-oriented;

2. similar and dissimilar hardware and/or operating systems;

3. use of commonly-supported (networked) data types, regardless of the application programming language, machines' native data representations (e.g., big or little endian), or code page (e.g., ASCII and various EBCDIC code pages).

4. packing and unpacking of procedure input and output parameters (i.e., marshalling and unmarshalling) for transport across the network by software stubs; and 5. other related features, such as authentication of the applications involved, as well as authorizations for access to the various distributed resources within the network.

The present invention extends the RPC mechanism beyond the limits of a single distributed system by replacing the traditional system for effecting switched communications outside the LAN based on redirection of device driver commands with a high performance machine that utilises the RPC mechanism in a procedure for dynamically allocating and controlling the hardware resources used in effecting switched communications links between the distributed and possibly heterogeneous environments of LANs and WANs.

Although the preferred embodiment of the invention is described in relation to the DCE implementation of OSF, it is pointed out that the present invention is not limited to this implementation, but is applicable to any network that supports synchronous RPCs and multi-threading.

FIG. 3 schematically illustrates the architecture of an active heterogeneous LAN with a switched communications gateway server and is representative of the type of heterogeneous environment to which the present invention is directed.

A LAN, generally designated by the numeral 30, consists of an electronic link 32 interconnecting single workstations 33 and 34, as well as different types of other local area networks 35, 36 and 37. As illustrated, networks 35 and 36 are examples of token ring LANs, and both networks 32 and 37 are examples of Ethernet LANs.

In the case of networks 35 and 36, an intelligent device, such as a router 38a and 38b, connects the multiple workstations/processors (generally denoted as 39 for network 35, and 40a and 40b for network 36) into the main LAN 32.

Network 37 connects workstations/processors 41a and 41b through a bridge 42 to the main LAN 32.

LAN applications may represent users that access remote server applications, such as users issuing outgoing calls. LAN applications may also represent services that are used by remote users and/or applications that initiate incoming calls from the remote side of the switched network.

A single gateway server 43 includes multiple ports 44 for linking the incoming and outgoing calls between users and servers in the LAN with remote users 46 and servers 47 across the outside switched network 45.

The RPC interface required for implementing the present invention is of the generic type, requiring only systems support of synchronous RPCs, such as provided by OSF, and multi-threading programming interfaces, such as described in the IEEE POSIX specification referred to above. Therefore, this invention can be implemented on a variety of multi-threaded RPC network implementations.

According to the preferred embodiment of the present invention, a high performance machine for effecting switched communications through a LAN gateway is achieved by augmenting the generic RPC mechanism with a communications interface (an application programming interface or API) that permits the applications on the LAN to generate at least 3 concurrent threads of control for 3 different functional categories.

Figure 4:
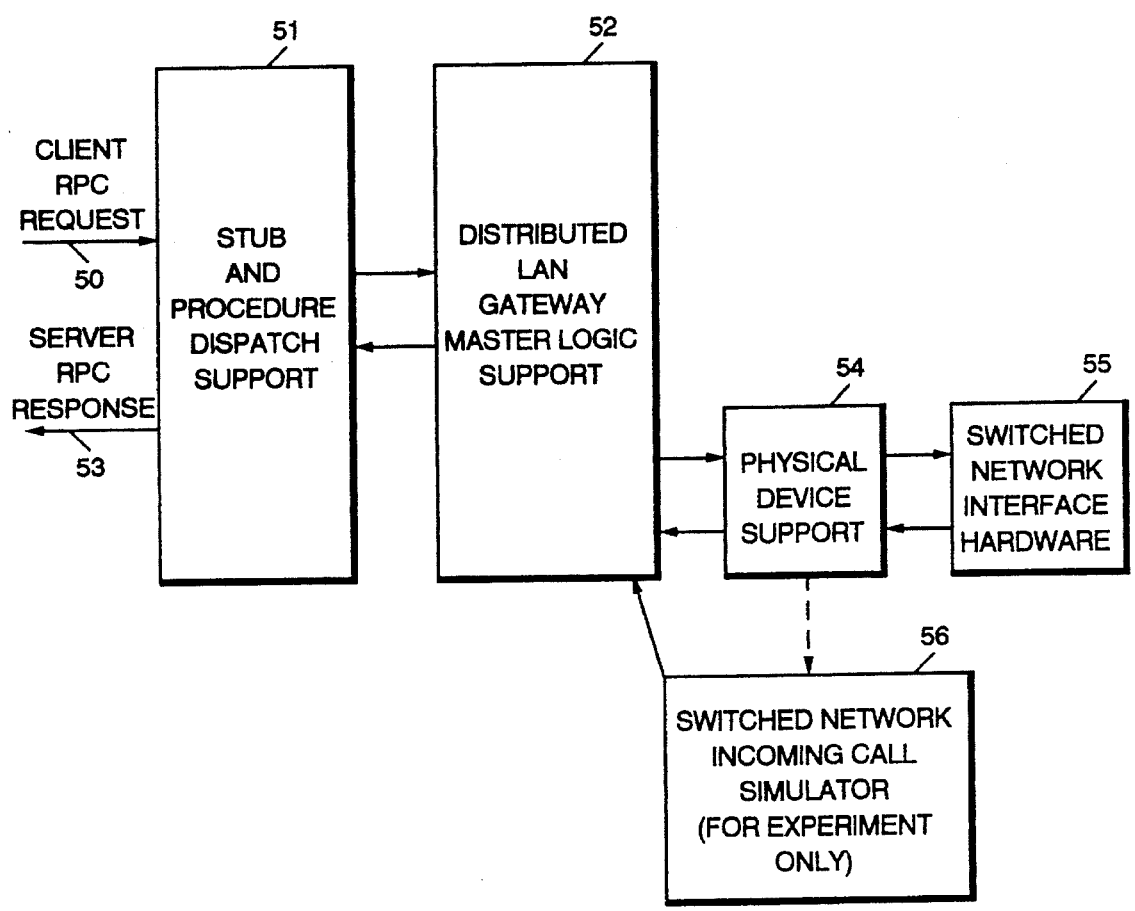
FIG. 4 is a block diagram of a gateway server implemented through remote procedure calls (RPCs) as a high performance machine, according to the invention.

As illustrated in FIG. 4, for an outgoing or incoming call (request) through a switched LAN gateway, a client machine on a LAN issues an RPC 50 that goes through the client stub processing and network routines, as well as the LAN and the server network routines, as described earlier in relation to FIG. 2. The RPC arrives at the server stub 51 with attendant procedure dispatch support, as described above. A message is sent to the LAN Gateway Master Logic support 52, which locates and binds a physical port 54 for effecting the switched link 55. When the switched connection is established (e.g., an outgoing call has been successfully made or an incoming call has been received), the reverse path is traversed and the RPC response 53 is sent back to the client.

Through the use of RPCs, error messages for non-connection simply due to all physical ports being occupied is avoided; the RPC thread for a user's outgoing call can be suspended, where all ports are occupied, until a port becomes available, and the calling procedure at the user will never be aware of the delay. For incoming call request RPC, the client thread is suspended until an incoming call has been received and bound to port 54.

The LAN gateway maintains two data buffers for each DCE client that requests use of a port; an output buffer for maintaining data characters to be transmitted to the switched network on behalf of the client and an input buffer for maintaining data characters that are received from the switched network for the client.

In tile preferred embodiment, the three types of functional categories for control threads are defined as:

1. an Input (I) thread, that is dedicated to receiving input from the switched network;

2. an Output (O) thread, that is dedicated to sending output to the switched network; and 3. an Event (E) thread, that is used for receiving asynchronous as well as synchronous communications events, such as those detected by the gateway from its switched communications network side.

Certain RPCs can be made from any of the threads, while others are allocated to one of the specific functional categories. The isolation of functions into distinct threads enables more efficient management of pointer and data structures at tile gateway server. This yields high performance in the communications mechanism through providing concurrency for dissimilar functions and enforced serialization for similar functions.

Modifications in thread allocation can be incorporated so that different threads can be used to issue RPCs that belong to the same functional categories as long as the RPCs are issued serially to ensure continued enforcement of function serialization. For procedures that should be called from a designated thread, serialization can be enforced by a server return code whenever the server is executing another procedure.

In the preferred embodiment, the various standard functions related to switched communications links have been allocated between the three threads in the following manner. These functions are labelled with easily recognisable generic names, and their usual operations briefly defined.

| procedures called from Input (I) thread | Operation |
| --- | --- |
| ReadData | reads characters in the input buffer received from the switched communications network |
| FlushInput | discards the characters in the input buffer received from switched communications network |

| procedures called from Output (O) thread | Operation |
| --- | --- |
| SendData | appends characters to the output buffer for transmission to the switched network |

| | -continued |
|---|---|
| SendBreak | specifies that a break signal is to be sent to the switched network |
| TransImmediate | expedites transmission of specified characters by-passing the output buffer |
| Drainoutput | transmits all characters in the output buffer before returning |
| Flushoutput | discards all characters in the output buffer |
| procedures called from Event (E) thread | Operation |
| ReadEvent | block thread until specified event(s) occur |
| procedures called from any thread | Operation |
| PortOpen | call for use of a communications port (returns a "handle") |
| PortClose | discontinue use of resources associated with the specified handle |
| Program_Profile | program communications port according to given input parameters |
| Read_Profile | read current profile of port |
| Connect | switched network connectivity request (requires connection type for input or output, and, in the case of outgoing calls, requires switched network address, i.e., telephone number) |
| Disconnect | terminates switched communication |
| Disconnect_Answer | terminates switched communication and automatically sets port back into call-receiving mode |

All of the foregoing operations except PortOpen are performed in relation to a particular "handle" (address, type, etc.) that is returned by the DCE gateway server after processing the PortOpen call. It should also be recognised that until a switched link has been established, an error message will be returned on any of the buffer related calls.

In the present invention, the LAN workstations cannot access the ports directly, but only through RPCs. The Master Logic Support is the only "box" with access to the network, and it can easily be regulated for central compliance with any network restrictions. The Connect, Disconnect, Disconnect_Answer and Program_Profile functions are then capable of modifying the hardware characteristics of the ports to the switched networks.

EXPERIMENTAL SET-UP

In order to establish the workability of the proposed embodiment and to demonstrate its cost-efficiency over known LAN gateways, a prototype was set-up to simulate a LAN gateway environment. Some features included in the experimental set-up relate to my concurrently filed application entitled "A Method and Mechanism for Allocating Switched Communications Ports in a Heterogeneous Data Processing Network Gateway" (docket no. CA9-93-015), the disclosure of which is hereby incorporated herein by reference.

Three workstations running the Distributed Computing Environment (DCE) of the Open Software Foundation (OSF) on a LAN were used in this experimental set-up. One workstation was for clients issuing incoming switched calls, a second was for clients issuing outgoing switched calls and a third for running a server emulating a LAN gateway. Multiple threads within one process were used to simulate multiple clients.

The gateway server was configured to allow for multiple parallel executor threads (up to four times the number of assumed ports in the gateway). The threads were triggered by the scheduling of arrived RPCs for execution, and each thread could run a single RPC at a time.

It is also pointed out that in the case of the particular release of the OSF DCE implementation, only a fixed number of outstanding RPCs are permitted at the server at any one time due to hard-coded limits on the environment for which DCE is configured, although during the experiment, the number of RPC retries by clients never reached one percent for each RPC.

The clients simulating requests for incoming calls communicated with the gateway server over connection-oriented (TCP/IP—Transmission Control Protocol/Internet Protocol) LAN connections, while other clients (those issuing simulated outgoing calls) used datagrams (UDP/IP—User Datagram Protocol/Internet Protocol).

The server also collected statistics for analyzing the workability and efficiency of the proposed system.

A timer thread 56 (FIG. 4) was used to simulate incoming calls from a switched network to the server. Upon waking up by the system following a sleep time corresponding to interarrival of calls, this single thread looked up the status of ports. If it did not find a port waiting for an incoming call, it would then record a switched call "loss"; otherwise, it would notify the Master Logic Support to bind the switched call to an RPC client that is awaiting a call (in this case, an incoming switched call "success" is recorded).

Figure 5:
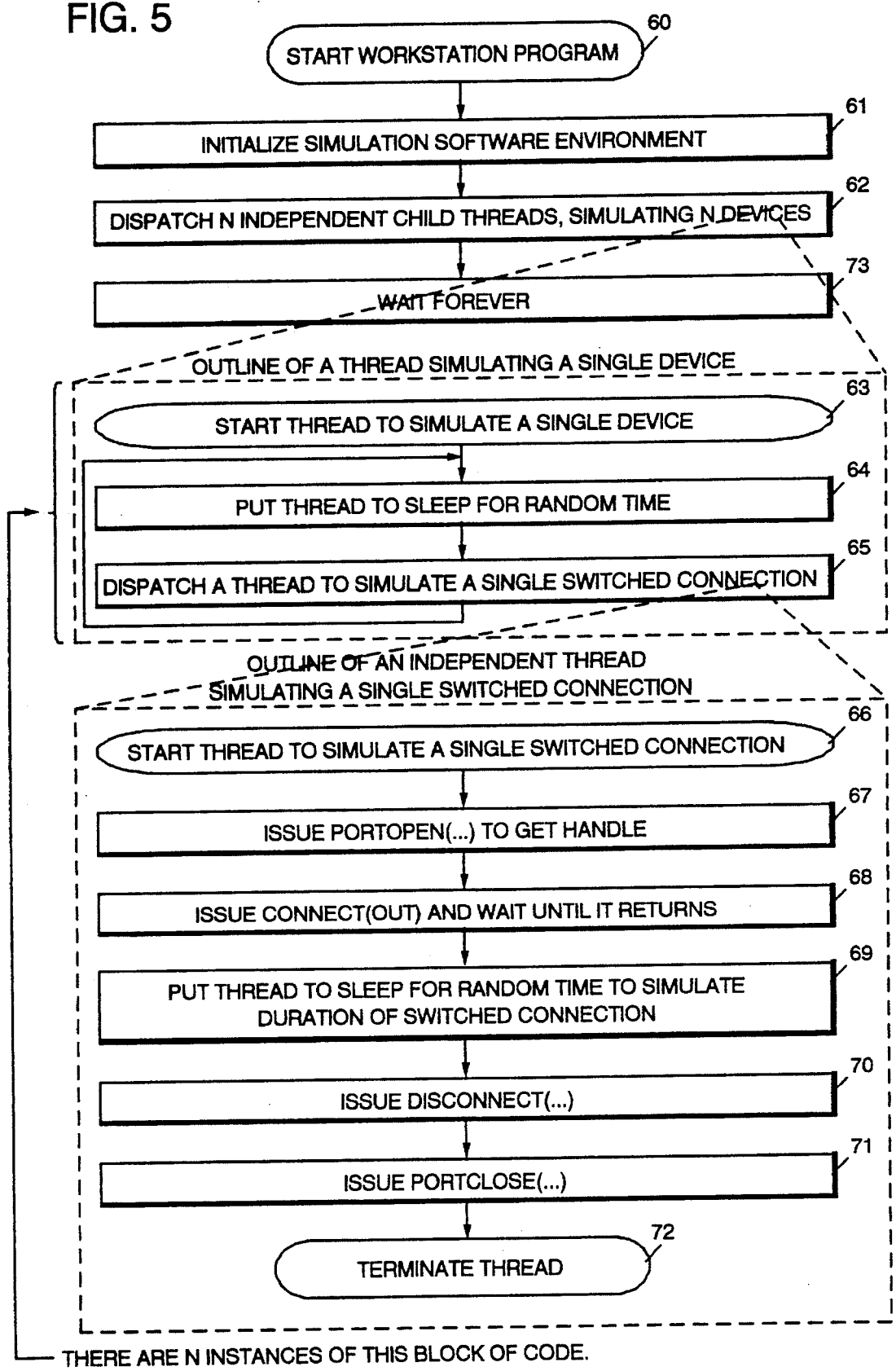
FIGS. 5 and 6 are flow diagrams illustrating the procedures used for emulating outgoing and incoming switched calls in an experimental set-up of a high performance machine for a LAN gateway, according to the invention.

FIG. 5 illustrates the simulation of clients issuing outgoing calls. After starting the workstation 60, common variables and protocols were initiated 61. Multiple independent threads were issued 62 to simulated multiple user devices seeking to issue multiple outgoing calls through the gateway server. For each single simulated device started 63, the thread was put to sleep for a random period of time 64 to simulate the random access to the gateway's resources from a real. LAN set-up.

After "waking" the device thread 65, a thread for sequential procedure calls for each thread simulating a single connection request was dispatched 66. A procedure PortOpen call was issued to the gateway server for each simulated client application thread 67.

The procedure call for each PortOpen command 67 issued by the client to the gateway server actually called a previously generated procedure stub. The call returned a handle from the server. The client then issued a Connect(out) 68 to the gateway that returned when a simulated successful outgoing call was established. The procedure call thread was then "put to sleep" for a random period of time 69 (to simulate random connection time between the LAN workstation application and a remote server), after which Disconnect and PortClose commands 70 and 71 were sequentially issued with the same handle before the thread was terminated 72.

Figure 6:
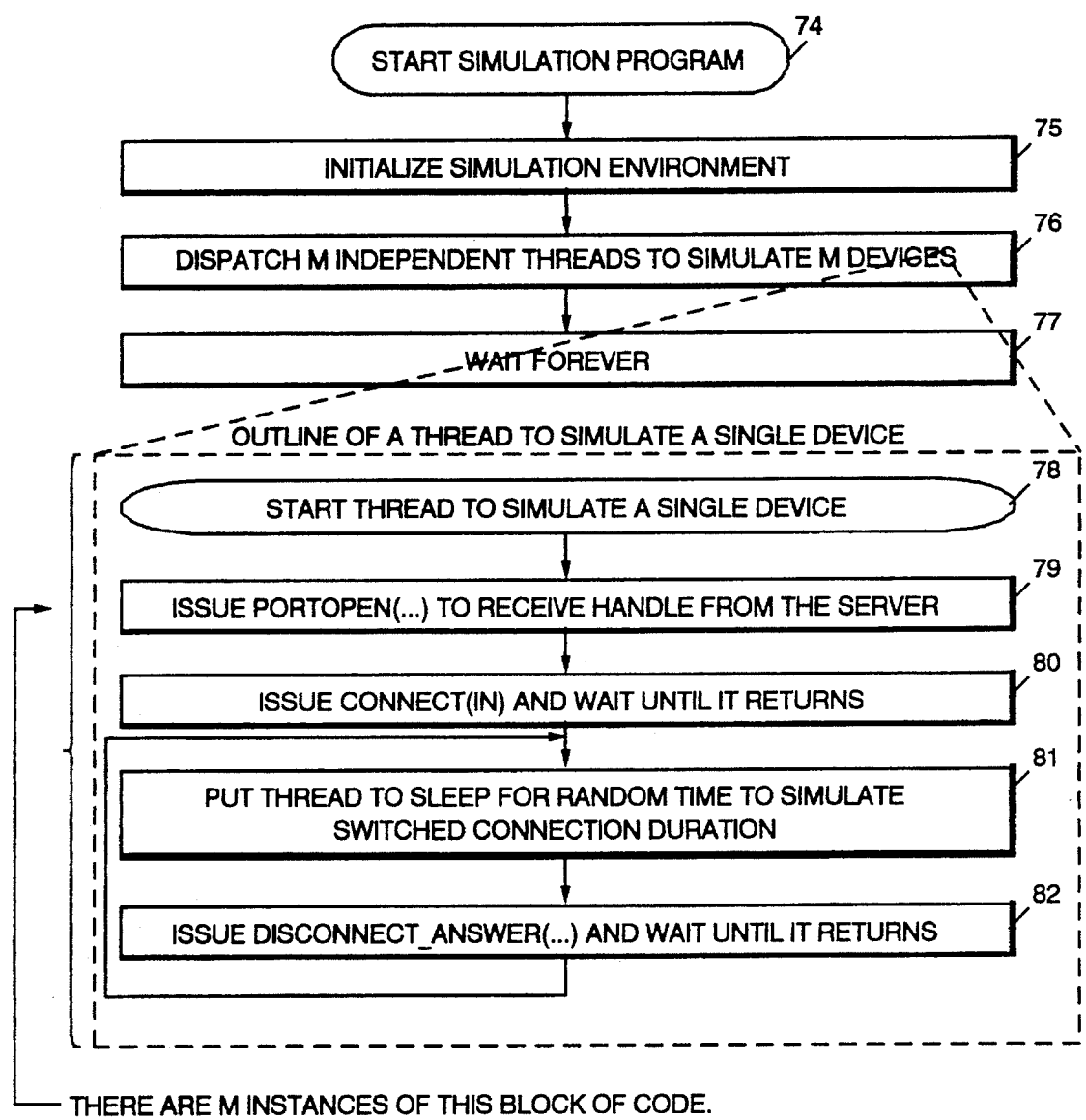

A simulation of an incoming call is illustrated in FIG. 6. After starting this workstation 74, common variables and protocols were again assigned 75, and multiple independent child threads (corresponding to the number of simulated ports) to simulate LAN servers for remote clients on a switched network, dispatched 76, while the main thread remained in control forever 77.

After start of each dispatched thread 78, a PortOpen call was issued to the gateway server to receive a handle 79. Then, a Connect(in) 80 was sent message to the gateway server; this RPC returned when a simulated incoming call had been successfully established.

To simulate data transmission over the established switched link, the thread was "put to sleep" for a random period of time 81. After "waking", the thread issued a Disconnect_Answer command 82 to simulate the immediate reoccupation of a port after disconnection. This procedure was repeated several times in the course of the experiment.

When long duration runs on the experimental set-up were made, it was found that the high performance machine proposed herein effectively provided concurrency in establishing switched communications links through a LAN gateway server, freeing hardware resources of the LAN not immediately involved in maintaining the switched links.

The gateway interface of the present invention is described in this application in use in a specific type of LAN architecture. It will be clearly recognized, however, that with appropriate modifications that would be obvious from the present description to a person skilled in the art, that the interface is portable and may be adapted for connecting other types of area networks having similar gateway characteristics.

The embodiments of the invention in which an exclusive property or privilege is claimed are defined as follows:

1. An interface mechanism for a switched communications gateway in a distributed computing network comprising:

means for issuing multiple remote procedures calls between at least one computer and the gateway across the distributed network;

means for concurrently processing the multiple remote procedure calls between said at least one computer and the gateway across the distributed network;

said means for concurrently processing the multiple remote calls including means for concurrently issuing at least three separate threads of control between said at least one computer and the gateway across the distributed system; said means for issuing at least three separate threads of control including means for issuing a first thread of control for functions related to receiving incoming data from a switched network;

means for issuing a second thread of control for functions related to sending data to a switched network;

means for issuing a third thread of control for functions related to opening and closing switched ports on the gateway;

means for identifying related functions;

means for assigning related functions to a same thread of control;

means for identifying remote procedure calls for related functions; and scheduling means for sequentially processing remote procedure calls for the related functions at the gateway.

2. An interface mechanism for a switched communications gateway in a distributed computing network comprising:

means for issuing multiple remote procedures calls between at least one computer and the gateway across the distributed network;

means for concurrently processing the multiple remote procedure calls between said at least one computer and the gateway across the distributed network;

means for identifying remote procedure calls for related functions;

scheduling means for sequentially processing remote procedure calls for the related functions at the gateway; and means responsive to a remote procedure call for locating an idle switched port in the gateway and for binding the remote procedure call to the located port.

3. An interface, according to claim 2, wherein the means for locating an idle switched port include means for differentiating between ports set for incoming and outgoing switched calls through the gateway, and between remote procedure calls requesting incoming and outgoing switched calls through the gateway.

4. An interface mechanism for a switched communications gateway in a heterogeneous distributed computing network comprising:

means for issuing multiple remote procedures calls between at least one computer and the gateway across the distributed network;

means for concurrently processing the multiple remote procedure calls between said at least one computer and the gateway across the distributed network;

said means for concurrently processing the multiple remote procedure calls including means for concurrently issuing at least three separate threads of control between said at least one computer and the gateway across the distributed system;

said means for concurrently issuing at least three separate threads of control including means for issuing a first thread of control for functions related to receiving incoming data from a switched network;

means for issuing a second thread of control for functions related to sending data to a switched network;

means for issuing a third thread of control for functions related to opening and closing switched ports in the gateway;

means for identifying related functions;

means for assigning related functions to a same thread of control;

means for identifying remote procedure calls for related functions; and scheduling means for sequentially processing remote procedure calls for the related functions at the gateway.

5. An interface mechanism for a switched communications gateway in a heterogeneous distributed computing network comprising:

means for issuing multiple remote procedures calls between at least one computer and the gateway across the distributed network;

means for concurrently processing the multiple remote procedure calls between said at least one computer and the gateway across the distributed network;

means for identifying remote procedure calls for related functions;

scheduling means for sequentially processing remote procedure calls for the related functions at the gateway; and means responsive to a remote procedure call for locating an idle switched port in the gateway and for binding the remote procedure call to the located port.

6. An interface, according to claim 5, wherein the means for locating an idle switched port include means for differentiating between ports set for incoming and outgoing switched calls through the gateway, and between remote procedure calls requesting incoming and outgoing switched calls through the gateway.

* * * * *